United States Patent
Goodale

[11] 3,880,068
[45] Apr. 29, 1975

[54] APPARATUS FOR WASHING AND BLANCHING OF VEGETABLES

[76] Inventor: Richard J. Goodale, P.O. Box 268, Watsonville, Calif. 95076

[22] Filed: May 18, 1973

[21] Appl. No.: 361,828

[52] U.S. Cl. .................................. 99/478; 99/517
[51] Int. Cl. .............................................. A23n 9/00
[58] Field of Search ............. 99/478, 470, 475, 443, 99/103, 373, 360, 361, 362, 367, 584, 473, 477–478, 516, 517; 126/348, 369; 21/61, 78

[56] References Cited
UNITED STATES PATENTS

| 2,556,385 | 6/1951 | Allan | 99/478 |
|---|---|---|---|
| 2,781,070 | 2/1957 | Kilburn et al. | 99/584 |
| 3,316,829 | 5/1967 | Folenauer | 426/510 |
| 3,352,338 | 11/1967 | Hirahara | 99/536 |
| 3,501,213 | 3/1970 | Trexler | 21/61 |

*Primary Examiner*—John W. Huckert
*Assistant Examiner*—Charles Gorenstein

[57] ABSTRACT

This apparatus employs a washing receptacle or tank provided with water into which the vegetables are dumped and the water is agitated so as to move the vegetables toward a part of the tank that is under the blanching chamber which is provided with wall structure that dips into the water in the tank so as to provide a water seal therewith. The vegetables are raised out of the water in the tank by a wire mesh conveyor which moves them through the blanching chamber in which steam jets are played upon the top and bottom of the vegetables as they are moved therethrough. The rear part of the blanching chamber is positioned over a portion of a second tank which is provided with water and portions of the wall structure of the rear of the chamber dip into the water of this second tank to provide a seal therewith. Two open troughs are connected between the first and the second tank and the intermediate parts of the side walls of the blanching chamber dip into these open troughs which are filled with water provided thereto from said tanks to form a water seal with the intermediate portions of the side walls. Thus, the entire blanching chamber is water sealed so as to prevent escape of steam therefrom. At the same time the first tank provides a way in which the washed vegetables are fed into the blanching chamber and the second tank provides a way in which the blanched vegetables are removed from the chamber through a cooling bath of cold water.

6 Claims, 3 Drawing Figures

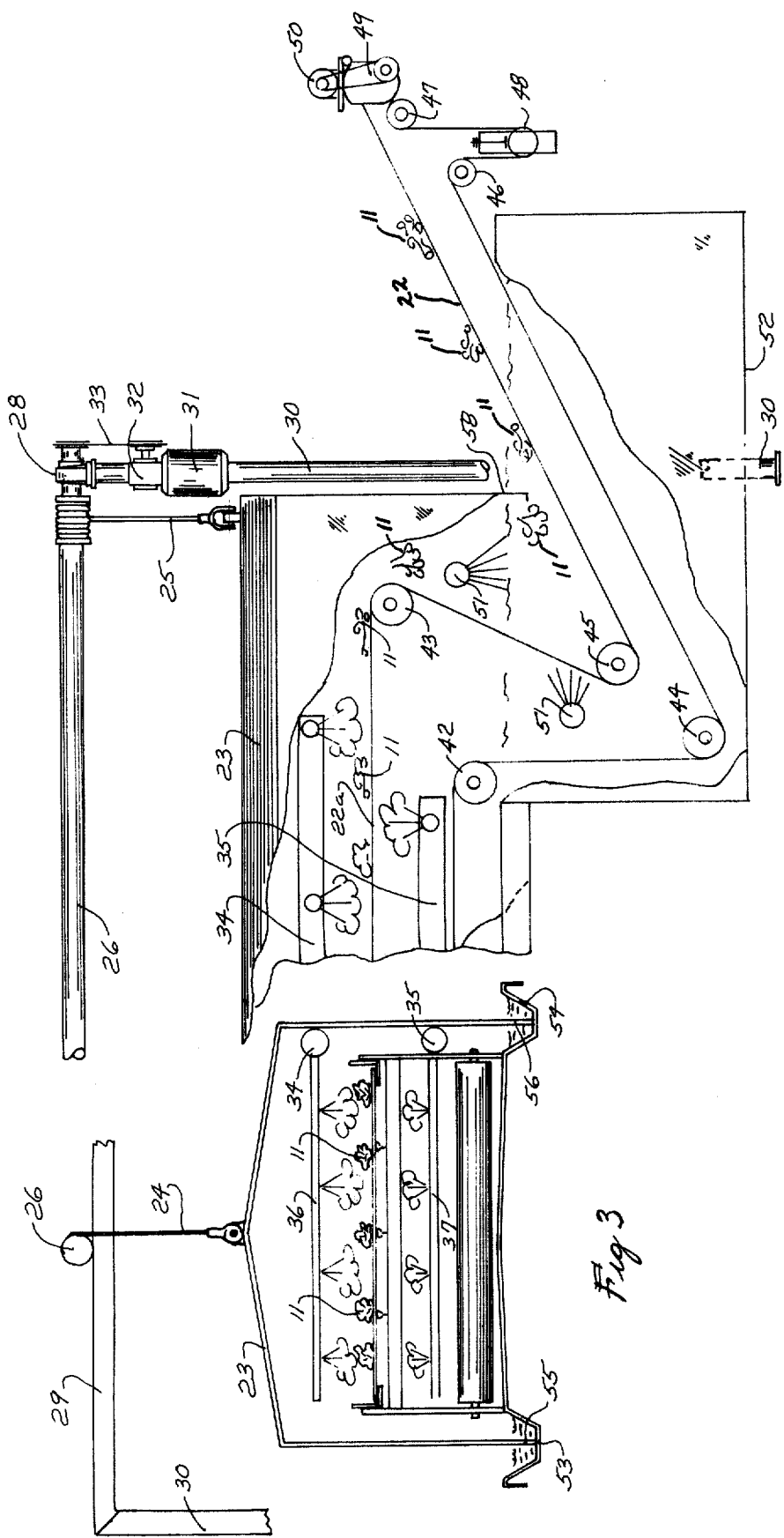

3,880,068

APPARATUS FOR WASHING AND BLANCHING OF VEGETABLES

DESCRIPTION OF THE INVENTION

This invention relates to apparatus for washing and blanching products such as vegetables.

An object of this invention is to provide an improved apparatus for washing and blanching vegetables in which the blanching chamber is provided with a water seal for reducing loss of heat therefrom.

Another object of this invention is to provide an improved vegetable blanching apparatus in which vegetables to be blanched are moved into the forward end of the blanching chamber from a water bath and in which the blanched vegetables are moved out of the rear part of the chamber into a cooling water bath, said chamber being constructed such that the water bath provide water seals to substantially reduce loss of heat from the chamber.

Other and further objects of this invention will be apparent to those skilled in the art to which it relates from the following specification, claims and drawing.

In accordance with this invention there is provided an efficient and economical apparatus for blanching of vegetables. The blanching chamber of this invention is constructed so that the bottom portions of the front, rear, and side walls thereof dip into water provided to tanks that are positioned under the chamber so as to water seal the bottom of the chamber and prevent steam, which is supplied to the chamber for blanching the vegetables, from escaping. The vegetables to be blanched are dumped into the tank at the forward end of the blanching chamber and are lifted out of the water in this tank into the blanching chamber by means of a conveyor which carries the vegetables through the steam atmosphere in the chamber and also removes the vegetables from this chamber into a cold water bath that is provided in a tank at the rear of the blanching chamber. After the vegetables are moved through the cold water bath, the conveying means moves them out to a suitable receiving means for further processing or use thereof.

Further details and features of this invention will be set forth in the following specification, claims and drawing in which, briefly:

FIG. 2 is a view of the rear part of this apparatus also partially broken away to show the vegetables being moved therethrough; and FIG. 3 is a cross sectional view of the middle part of the blanching chamber showing the bottom portions of the side walls thereof immersed in water to provide water seals thereto.

Figure 1:
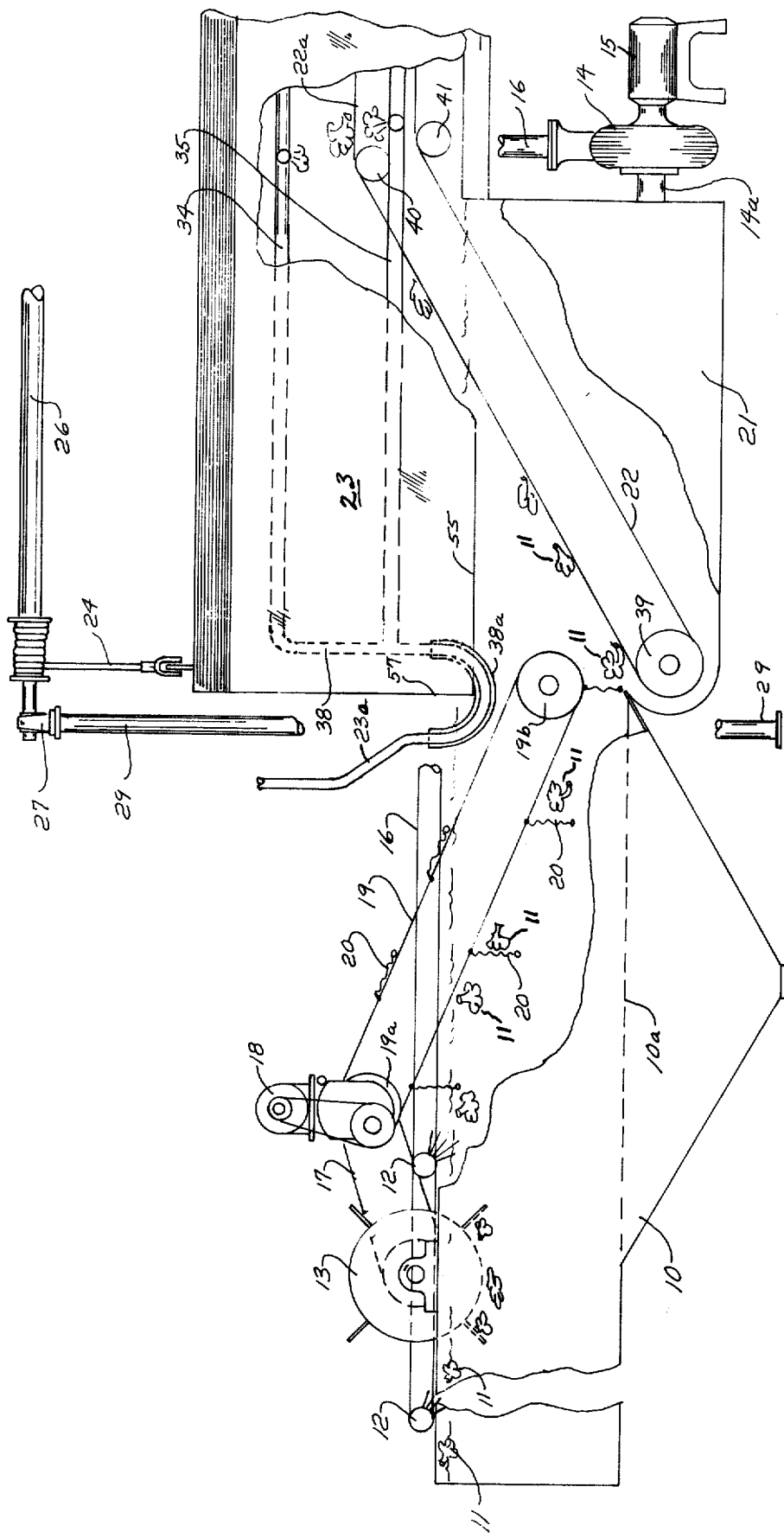
FIG. 1 is a partial view of this apparatus showing the forward part thereof partially broken away to show the vegetables being moved therethrough.

Referring to the drawing in detail, reference numeral 10 designates a tank having water therein into which the vegetables 11 are dumped so that they are washed during the agitation of water in the tank. The bottom of the tank 10 is of funnel-shape and it is provided with a drain at the lowermost portion thereof which may be opened when it is desired to clean the tank. The vegetables 11 float in the water and they are submerged by the water coming from the nozzles 12. The vegetables are also submerged and moved through the water by the paddle wheel 13 which is driven by the belt 17 and electric motor 18.

A suitable reduction gearing is interposed between the output of the motor 18 and the pulley driving the belt 17 so that the paddle wheel 13 is driven at a suitable reduced speed. The paddle wheel 13 is especially useful for submerging vegetables such as spinach as these are moved forward in the tank.

The nozzles 12 are connected to the pipe 16 which is connected to the outlet of the water pump 14 that is driven by the electric motor 15. The inlet 14a of the pump 14 is connected to the rear of the tank 21 and pumps water out of this part of the tank and supplies this water to the pipe 16 and nozzles 12 so that there is a continuous circulation of water from the forward part of the tank 10, into which the vegetables 11 are dumped, and the rear part of the tank 21. The vegetables 11 are pushed into the water in tank 10 by the water jets from nozzles 12 and the paddle wheel 13 and as a result they are moved under the wire mesh belt 19 which is provided with curtains 20 that droop from the bottom thereof. The curtains 20 on belt 19 catch and move the vegetables 11 toward the rear of the tank 10 and into the tank 21.

The conveyor 22 dips down into the tank 21 under the lip of the tank 10 so that the vegetables 11 moved out of the tank 10 by the curtains 20 of the belt 19 are received by this conveyor and moved thereby into the blanching chamber 23. Chamber 23 is in the shape of a hood that is attached to cables 24 and 25 at the forward and rear parts, respectively, thereof. The cables 24 and 25 are wound on the member 26 when it is desired to raise the hood 23. The member 26 is supported by bearings 27 and 28 on the tops of frame members 29 and 30, respectively. An electric motor which is provided with the reduction gearing 32 is supported on the frame member 30 and drives the belt 33 which rotates the member 26 when it is desired to raise or lower the hood 23.

Steam is supplied to the headers 34 and 35 which are positioned under the hood 23. Headers 34 and 35 are connected to the pipe 38 which is connected to the elbow that is provided with an insulation covering 38a in the part thereof that is immersed in the water in the tanks 10 and 21 so that steam passing through this elbow is not cooled by the water bath. Steam provided by a source (not shown) is supplied to the steam pipe 23a that is connected to pipe 38.

The wire mesh conveyor 22 is supported by the roller 39 in the lower part of the tank 21 and additional rollers 40, 41, 42 and 43 are provided for supporting the conveyor 22 in the steam chamber or hood 23. Rollers 40 and 43 support the conveyor portion 22a between the steam pipes 36 and 37 that are connected to the headers 34 and 35, respectively. Several steam pipes 36 and 37 are provided in the blanching chamber, and each of these pipes is provided with several holes from which steam jets emerge and are played upon the top and bottom of the vegetables supported by the wire mesh conveyor 22a.

After the vegetables 11 are moved by the conveyor through the steam jets they are dumped at the roller 43 into the water in the tank 52. Cold water sprays are played into this tank from the pipes 51 and the vegetables dropped into the cold water are submerged by the action of these sprays. The vegetables are picked up by the conveyor after it moves down around the underside of the roller 45. The conveyor then moves the vegetables upward out of the water and carries them out of the tank 52 to be received by a suitable receptacle (not shown). The conveyor 22 is driven by the electric motor 50 which is provided with a suitable reduction gearing 49 constructed to drive the conveyor 22 at a desired speed. The conveyor 22 passes over the roller 47 and down under the tensioning device 48. From the device 48 the conveyor passes over the roller 46, down into the tank 52 and under the roller 44. From roller 44 the conveyor passes over the roller 42 and through the lower part of the blanching chamber to the roller 41 and from the latter to the roller 39 which is located in the tank 21.

Tanks 21 and 52 are connected by means of the open troughs 53 and 54 which are positioned directly under the midportions of the side walls 55 and 56, respectively, of the hood 23. Thus, the lower portions of these side walls 55 and 56 are immersed in water in the troughs 53 and 54, respectively. The forward portion of the hood 23 extends over the tank 21 and the lower parts of the side walls and the front wall 57 of the hood 23 are immersed in the water in the tank 21. Likewise, the rear portion of the hood 23 extends over the tank 52 and the lower parts of the side walls of the hood and the rear wall 58 thereof are immersed in the water in the tank 52. Thus, the entire circumference of the lower part of the hood 23 is immersed in water so as to provide a water seal thereto and prevent steam supplied into the hood from escaping to the outer atmosphere.

While I have shown and described a preferred form of the invention it will be apparent to those skilled in the art to which it relates that the invention is capable of variation and modification from the form shown so that the scope thereof should be limited only by the proper scope of the claims appended hereto.

What I claim is:

1. In apparatus for blanching products such as vegetables, the combination comprising a first tank having water for immersing vegetables placed therein, a blanching chamber having wall structure extending over at least a portion of said tank, selected lower portions of said wall structure being immersed in the water in said tank, means conveying the washed vegetables from said tank into said chamber, means supplying heated fluid to said blanching chamber, said conveying means moving said vegetables through the heated fluid atmosphere in said chamber, a second tank having water therein, said blanching chamber having wall structure extending over at least a portion of said second tank, other selected lower portions of said wall structure being immersed in the water in said second tank, said conveying means moving said vegetables from the heated fluid atmosphere in said blanching chamber into the water in said second tank, means to circulate water from the second tank to the first tank such that a natural flow of water with the product movement occurs from the first tank towards the chamber and from the chamber towards the second tank to enhance the product flow, and means including said wall structures immersed in the water in said tanks substantially closing said chamber thereby reducing loss of heat therefrom.

2. In apparatus for blanching products such as vegetables, the combination as set forth in claim 1, further comprising means circulating the water in said first tank to wash and move the vegetables toward said conveying means.

3. In apparatus for blanching products such as vegetables, the combination as set forth in claim 1, further comprising trough means connecting said first and said second tanks so that the water level in said tanks is the same.

4. In apparatus for blanching products such as vegetables, the combination as set forth in claim 3, further characterized in that said trough means comprises a pair of open troughs extending between said tanks and portions of said blanching chamber wall structure immersed in water in said troughs to form part of said chamber closing means.

5. In apparatus for blanching products such as vegetables, the combination as set forth in claim 4 including means supporting said chamber above said tanks and said troughs said supporting means being adjustable to raise and lower the chamber relative to said tanks.

6. In apparatus for blanching products such as vegetables, the combination as set forth in claim 1 including means for directing a water flow towards the conveying means in the second tank to assist in moving the product from the conveying means and into the water of the second tank.

* * * * *